April 20, 1971 K. F. MILLER ET AL Re. 27,116

PIEZOELECTRIC MULTIELEMENT DEVICE

Original Filed Jan. 5, 1966

INVENTORS
KENNETH F. MILLER,
MELVIN H. SMITH
BY

United States Patent Office

Re. 27,116
Reissued Apr. 20, 1971

27,116

PIEZOELECTRIC MULTIELEMENT DEVICE

Kenneth F. Miller, Glendale, and Melvin H. Smith, Parris, Calif., assignors to Bourns, Inc.

Original No. 3,378,704, dated Apr. 16, 1968, Ser. No. 518,902, Jan. 5, 1966. Application for reissue Dec. 5, 1968, Ser. No. 806,755
Int. Cl. H01v *7/00*
U.S. Cl. 310—9.0 10 Claims

Matter enclosed in heavy brackets [ ] appears in the original patent but forms no part of this reissue specification; matter printed in italics indicates the additions made by reissue.

The invention herein disclosed pertains to devices utilizing the piezoelectric effect, and more particularly to improvements in such devices and modes of manufacturing them.

The piezoelectric effect is well known to those of experience in the electrical and electronic arts, and to students of physics. Utilization of the effect as in translation of sound waves to electric variations, and of the converse as in the translation of electric wave energy to mechanical oscillations, for example, are well known. In general, pressure is applied to a piezocrystal bearing conductive coatings or bearing against conductors which exhibit the electric potential difference induced by action of the pressure upon the crystal; or, in the converse case, the electric potential difference is applied across the crystal and the mechanical change of dimension of the crystal is utilized as the output of the transducer. The present invention is concerned with means and methods for greatly augmenting or enhancing the transduction attainable, in a specific volume of apparatus, utilizing the piezoelectric effect. Stated in other ways, the invention is concerned with greatly increasing the mechanical movement attainable by piezoelectric action in response to application of potential difference, and with the piezoelectric device and method of producing it whereby the improvement in result is attained.

Briefly, a piezoelectric device according to the invention is produced by forming a plurality of very thin films of material capable of being transformed into effective piezoelectric form, forming on or applying to a restricted portion of one face of each of the films a thin electrically conductive coat, laminating the thus modified films by superposition or stacking in a particular way, subjecting the laminar assembly or stack to a compressing action or force as by means of dies to form the assembly into a *monolithic* [unitary] substantially solid *greenware* mass, firing the *greenware* [unitary] mass at a high temperature to produce an object comprising a plurality of thin electrically-conductive sheet-like elements each isolated from another next-adjacent thereto by thin elecrically nonconductive *film-like portions* [films] of *a monolithic mass of* crystalline material, electrically interconnecting appropriate selected sets of the conductive sheet-like elements, and subjecting sets of the thin *film-like portions* [films] of crystalline material to polarizing action by applying appropriate electric potential to appropriate sets of the conductive elements while the *monolithic* [unitary] device is brought from a temperature above the Curie point of the crystalline material to a temperature below the Curie point. Suitable terminal devices or means may be affixed or applied to respective sets of the conductive elements.

In the specifically described exemplary piezoelectric device herein illustrated in connection with a preferred exemplary mode of fabrication, certain specific materials will be named, certain specific configurations of films and of conductive coats will be described, and certain interconnections of conductive coats or elements will be shown and described; however, it will be understood that other materials may be used as will be indicated, other configurations of films and conductive coats may be used as will also be indicated, and other electrical connection arrangements may be used, all without departing from the spirit and scope of the invention which is defined by the claims.

In more detail an exemplary novel piezoelectric device according to the invention is made as follows: A suitable potentially piezoelectric polycrystalline substance, such as $BaTiO_3$ (barium titanate) alone or with other materials and in very finely divided form, is thoroughly mixed as in a ball mill with a suitable binder material such as a water emulsion or solution of polyvinyl acetate. Mixing and milling are carried on until a uniform dispersion of ceramic slip consistency of the polycrystalline material in the binder is attained. The mixture or slip is then spread out or applied in thin-film form upon a very smooth supporting surface such as that of a glass sheet, upon which it is left to dry. When dried, the film is severed into a plurality of separate parts or smaller films either before or after removal from the supporting surface, the parts being cut to shape according to the size and configuration of the final device to be made and in this instance into small rectangular films. Each film then has applied thereto as by silk screen deposition a layer of conductive material such as finely-divided platinum, the application of the conductive material being restricted so as to provide an uncoated marginal area except where electrical (terminal) connections are to be made. Further the uncoated marginal areas and coated portions thereof will ordinarily be different for respective sets of films so that respective different electrical connections made to the different sets of [superposed films] *layers of conductive material* will not interfere with each other. Thus the conductive layer or coat may be applied to *the central and* left-hand longitudinal marginal areas in the case of one set of films, to *the central and* right-hand longitudinal marginal areas in the case of another set of films, and to *the central and* an end portion in the case of another set, all of the films being rectangular and of the same *size* [shape].

Following application of the conductive layers and drying thereof if necessary, the films are stacked in superposition, with conductive marginal edge portions of alternate films at one end and half of the conductive marginal edge portions of intervening films at opposite sides in sets; whereby in the stack each conductive coat is separated from the next adjacent ones thereof by a nonconductive film and whereby terminal connections can readily be made to the three sets of conductive elements thus arranged.

The laminated films, superposed as previously described, are as a mass disposed in a press or die, and are therein subjected to pressure of the order of 10,000 p.s.i. whereby the films and conductive layers are compacted into a relatively stiff or rigid *monolithic greenware* [unitary] mass. Thereafter, the unitary *monolithic greenware* mass is fired in a kiln according to a time temperature schedule that is best determined experimentally for each combination of film configuration and size and number and thickness of layers or laminations. As an example of a firing schedule or program for an exemplary device, the following is cited: After pressing at 30° C. the consolidated structure is brought during phase A of the firing to 200° during approximately thirty minutes, then slowly but at an increasing rate brought during phase B to 400° C. during the next ninety minutes, then brought to 1300° C. during a noncritical phase C period of approximately 120 minutes. Thereafter the device is permitted to slowly cool to room temperature during a noncritical phase D.

Following firing and cooling as previously described, the edge *faces* [face] of the *fired device* [unitary assem- ɔly] at the coated margin areas *are* [is] abraded or ground to fully expose the terminal portion of each coating *or element* of the sets of conductive elements, and interconnecting or terminal means are applied. Silver paint or other suitable conductive material is applied along appropriate portions of the ground terminal areas at the edges of the device, to form a firmly adherent base for soldering terminals to the device. Following application of terminal means by soldering, the device is heated to a temperature above the Curie point of the polycrystalline mass and polarizing electrical stress is applied to appropriate terminals while the device is cooled to a temperature below the Curie point. In the cited instance the polarizing potential was 150 volts. The exemplary device is found to be exceptionally sensitive and effects or produces remarkably increased mechanical translations when relatively low potential differences are applied. On the other hand, relatively large electrical effects are produced and evidenced at the terminals in response to small applied mechanical stresses.

The preceding brief general description of the invention with some references to specific details of particular exemplary modes and devices make it evident that broad general objects of the invention are to provide improvements in piezoelectric devices and methods of producing the same.

Another object of the invention is to provide a polycrystalline piezoelectric device having novel electrical and mechanical characteristics.

An additional object of the invention is to provide novel improvements in the manufacture of polycrystalline piezoelectric devices.

Other objects and advantages of the invention are set forth or made evident in the appended claims and the following description, reference being made therein to the accompanying drawings forming a part of this specification. In the drawings:

Figure 1:
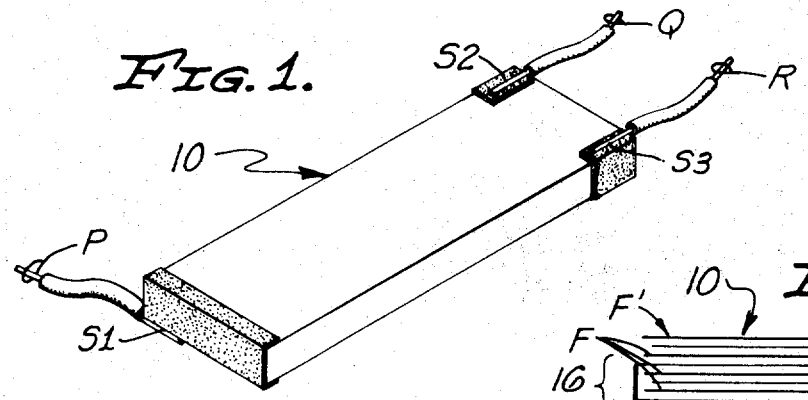
FIG. 1 is a pictorial view, to no particular scale, of a simple form of exemplary piezoelectric device according to the invention, with applied electrical terminals.

Referring first to FIG. 1, the simple exemplary form of device according to the invention is denoted 10. It is of generally thin block-like rectangular configuration, having terminal structures S1, S2 and S3 of applied electrically conductive material such as silver, and further having terminal leads P, Q and R as indicated. This chosen exemplary form of piezoelectric device according to the invention is constructed with a view toward producing a device which will longitudinally bend, or "bow," under the influence of applied electric potential; or which will, when subjected to bending stress, produce across terminals thereof an electric potential. The direction of bending is dependent upon the polarity of the applied electric potential; and, similarly, the polarity of the produced potential is dependent upon the direction of the bending stress. It will be understood, however, that the device need not in all cases be constructed to bend or translate bending stress into electric potential but many merely contract and expand as do elementary piezo crystals but with amplified movement and effect.

The exemplary block-like *monolithic* structure depicted in FIG. 1 is constructed principally *from* [of] of plurality of laminated thin sheet-like members F (FIGS. 2, 3 and 4) each of which members has a respective applied layer of conductive material *to form thereon a conductive element* of particular configuration such as C, C1 and C2. The material for the film-like members F of the exemplary device is made by ball-milling a mixture comprising, by weight, 100 parts of a mixture comprised of $BaTiO_3$ (93.5%), $CaTiO_3$ (2.3%), $PbTiO_3$ (3.9%) and the remainder $TiO_2$, all by weight, 50 parts of synthetic resin marketed by Rohm and Haas Co., Washington Square, Philadelphia, Pa., under the trade name Acroloid B7, 70 parts of 1,2 dichloro ethane, one part of di-octyl phthalate, and 5 parts of chlorinated hydrocarbons marketed by Monsanto Chemical Company, St. Louis, Mo., under the trade designation "Arochlor 55." The several components are thus thoroughly mixed to form a spread-like ceramic slip, which is then spread by doctor blade or like means onto a smooth surface such as a flat glass plate, and permitted to air-dry to form a film. The spreading is such as to provide an exemplary dried film thickness of the order of .004 inch.

Continuing, the dried film is cut to form the sheet-like members F, and each such member is given a respective conductive coat of required areal form or configuration by silk-screening thereon finely divided conductive material, for example, platinum. The conductive coats *or elements* are of *three* differing areal configuration as shown and are such as to leave an uncoated margin m and coats C (FIGURE 2), C1 (FIGURE 3), and C2 (FIGURE 4) each of which coats has *a central portion between marginal areas and* a respective terminal portion t differently positioned as indicated. A plurality of films of each coat *or conductive element* configuration are prepared or made, and a pair of uncoated cover films F′ also, and a stack of such films is made, conductive coat upward, with cover films F′ outermost, as diagrammatically indicated in FIGURE 5.

Figure 5:
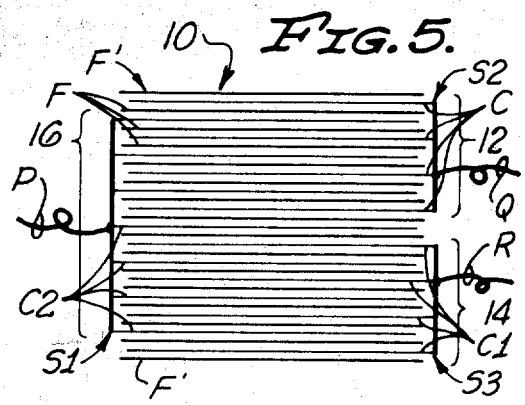
FIG. 5 is a diagrammatic representation indicating the juxtapositional arrangement of components such as those illustrated in FIGS. 2, 3 and 4, as arranged for electrical connection for application of polarizing potentials, and indicating the electrical interconnection of conductive elements of sets of such elements for application of polarizing potential.
Figure 2:
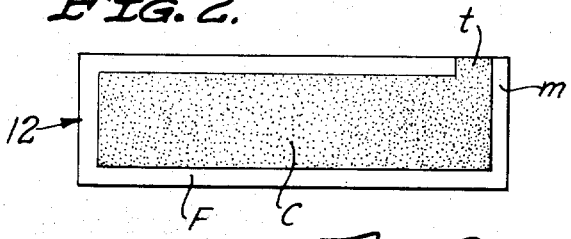
FIG. 2 is a plan view of a single lamination or film used in producing the device depicted in FIG. 1, with a first conductive-coat configuration.
Figure 3:
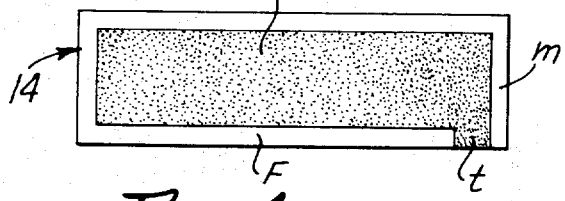
FIG. 3 is a plan view similar to FIG. 2, depicting a second configuration of conductive coat on a similar film.
Figure 4:
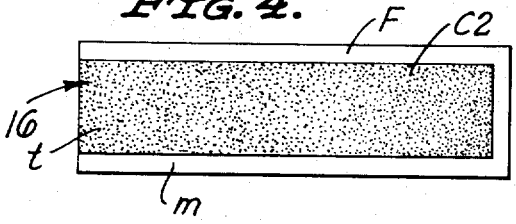
FIG. 4 is a plan view similar to FIG. 2, depicting a third configuration of conductive coat.

As is made evident in FIGURE 5, alternate *films* [elements] 16, of the principal part of the entire stack *of films* comprise a conductive coat C2 of the configuration depicted in FIGURE 4, while the upper [one] half of the intervening *films* [elements] 12 bear conductive coats C of the configuration depicted in FIGURE 2 and the other or lower half of the intervening *films* [elements] 14 bear conductive coats C1 of configuration indicated in FIGURE 3. Thus it is evident that when *the films are* thus stacked or *superposed* [laminated], the conductive coats *or elements* of *films* [elements] 16 are exposed at one end of the stack whereby conductive terminal S1 (FIGURE 1) can be applied to electrically interconnect all of the elements *of films* 16. Also, the upper half of the intervening *films* [elements] 12 of the stack are positioned so that the respective terminal portions t of the *conductive* coats thereof are exposed at one side of the opposite end of the stack whereby a conductive terminal S2 can be applied. Likewise, in the case of the lower half of the intervening *films* [elements] 14, the terminal portions t are aligned and positioned for application of a third terminal, S3, opposite the terminal S2.

Following stacking of the *films* [elements] 12, 14 and 16 as previously described, upper and lower uncoated cover films F′ are applied, the stack is disposed in a close-fitting cavity die, and the structure is subjected to compressive force applied normal to the planes of the *super-*

*posed stack of films* [laminated elements]. The structure comprising the stacked *films* [elements] 12, 14 and 16 is thus subjected to an exemplary consolidating pressure of the order of from 5,000 p.s.i. to 15,000 p.s.i. and for example of 10,000 p.s.i, preferably at a temperature of the order of 40° C, for a period sufficiently long (e.g., thirty seconds) to cause the *films* [elements] to consolidate into or form a unitary block-like *monolithic* greenware mass. Thereafter the coherent unitary *monolithic* mass, of the nature of compressed ceramic greenware, is subjected to a firing schedule in a kiln to form a strong coherent *monolithic* [unitary] bisque device containing sets of substantially parallel thin sheet-like discrete conductive elements formed and provided by the coats of conductive material. Some portions of the firing schedule are not critical; however, the initial heating to 400° C. must not be too rapid, since during that phase the organic components are decomposed and with the various volatile components are driven off. For example, for a compressed greenware mass of thickness .04 inch *made from an assembly* comprising twelve active or metal-coated films and two uncoated cover films, the initial heating to 200° C. is preferably effected at a uniform rate over a period of at least one half hour. Increase of the firing temperature from 200° C. to about 400° C. must not in this example exceed about 130° C. per hour, lest too rapid evolution of gaseous products cause internal blistering and degradation of desirable characteristics of the device. Continuing the firing after a temperature of 400° C. is reached or at which at least the principal portion of the resinous binder material has been decomposed and driven off, the temperature is brought up to 1300° C. over a period dependent to some extent upon the kiln being used, but ordinarily of the order of from one to two hours. The firing temperature is maintained at 1300° C. for from twenty to thirty minutes, and then the device is allowed to cool slowly to room temperature. It is evident that for other thicknesses of the greenware structure, appropriate variations of the heating schedule may be effected, the heating period being extended in the case of thicker masses. Also, if other permissible equivalent binder materials are used, variation of the heating schedule may be made to provide an optimum schedule as may be determined experimentally.

Following cooling, the edges of the [unitary] block or mass are ground to provide smooth faces and to facilitate application of terminals. Silver paste or paint is applied over appropriate terminal areas or portions of the edges of the block and adjacent portions of the faces, and fired to produce terminals as indicated at S1, S2 and S3 in FIGURE 1. To the silver terminals, wire or other terminal devices P, Q and R are preferably applied, as by soldering.

Following application of the terminal means, the *monolithic* [unitary] device is ready to be polarized whereby the desired piezoelectric characteristics are attained. To accomplish polarization, sources of potential approaching but not equal nor in excess of the maximum the dielectric material can successfully withstand are connected across respective terminals PQ and PR, with opposite polarities applied to terminals Q and R, relative to terminal P; and the device is brought up to a temperature somewhat above the Curie point of the piezoelectric dielectric material, preferably with the device immersed in a bath of silicone oil. In this example, the exemplary device was brought to a temperature of 150° C. while potentials of 150 volts of opposite polarity were applied across terminals P–Q and P–R, respectively. Thereafter, the temperature was lowered to below the Curie temperature, and application of the potentials was terminated. Thus the exemplary novel piezoelectric device depicted in FIGURE 1 is produced.

For use, the terminals Q and R are electrically connected together to form a terminal here termed QR, and that composite terminal is used with terminal P as the two terminals of the device. Thus, potential may be applied between the two terminals P and QR, whereupon the device will bend or assume a curved form between its ends. The direction of bending is dependent upon the poling of the applied potential. Thus it is evident that if alternating potential is applied across terminals P and QR, the device will alternately bend in opposite directions, or vibrate, in synchronism with the alternations of the applied potential. The bending is due to longitudinal contraction of the set of piezoelectric "layers" adjacent one face of the device and the concurrent elongation of the other, oppositely polarized, set of piezoelectric layers or mass adjacent the other face of the device.

Due to the multiple character of the somewhat laminar structure of the device, in which a plurality of marginally integrally bonded layers of polycrystalline piezoelectric material are separately excited by potential applied to the intermediate films of conductive material, there is a considerable amplification or increase of physical bending or distortion over that obtainable in the case of, for example, two layers of piezoelectric material separated by a metal member, or a single crystal or single layer of polycrystalline piezoelectric substance. Further, relatively extensive physical distortion, such as bending, is attainable with much lower applied potential difference than is required with any of prior-art piezoelectric devices. Thus in the case of the described exemplary rectangular block-like *monolithic* device (approximately 1 inch by 5/16 inch wide by 3/64 inch thick), an applied potential difference of four volts applied across terminals P and QR produced easily measurable bending of the device.

Figure 6:
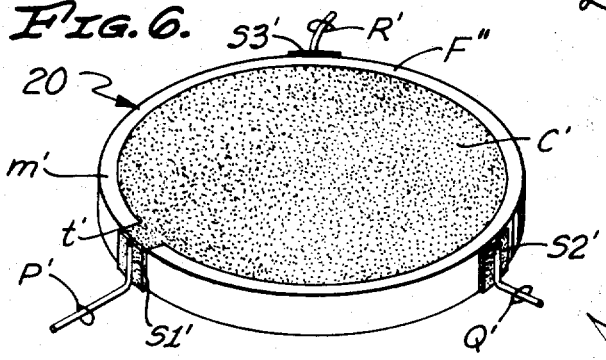
FIG. 6 is a pictorial view of a second simple form of exemplary piezoelectric device according to the invention.

The novel method of producing the novel device as hereinbefore described can readily be modified in a now somewhat evident manner to produce specially shaped piezo devices having the novel characteristics previously noted and/or other desirable characteristics. For example, and with reference to FIGURE 6, circular films F′ bearing metal coats C′ of the configuration shown and having uncoated arcuate margins m′ and terminal areas t′ may be stacked in the manner indicated by the diagram of FIGURE 5, with alternate film terminal areas t′ superposed to provide for an applied terminal S1′, and with an upper set (first half) of the intervening film terminal areas superposed for an applied terminal S2′ and the lower set (second half) of the intervening film terminal areas superposed for an applied terminal S3′, the terminals being disposed in any desired spaced-apart and mutually insulated relationship (120° apart as shown, for example). The stacked films (preferably with insulative cover films, not shown) are then subjected to compression, heating and firing, grinding, application of terminals, and polarizing in a manner the same as that previously described in connection with the device depicted in FIGURE 1. The completed device as depicted in FIGURE 6 will, when subjected to alternating potential with applied terminal means Q′ and R′ interconnected to provide a composite terminal Q′R′, alternately become convex and concave on either face.

Figure 7:
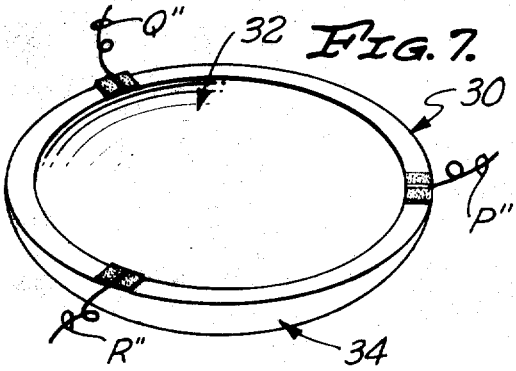
FIG. 7 is a pictorial view of a modified form of the exemplary device depicted in FIG. 6.
Figure 8:
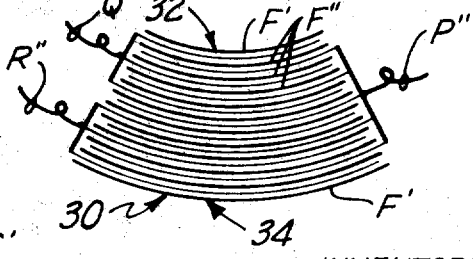
FIG. 8 is a diagrammatic representation similar to FIG. 5, depicting the electrical arrangement of electrically conductive elements of the superposed components and the electrical connections as arranged for polarizing the piezoelectric structure.

In a similarly evident fashion, sets of superposed disc-shaped coated films such as those described in connection with FIGURE 6 and similarly arranged with insulative cover films may be subjected to consolidating pressure in a specially formed die, to produce other than a substantially flat disc-like device. For example, such a stack of coated films so arranged may be subjected to compression between mating die device having surfaces comprising portions of a sphere or the like, whereby a dished or curved-surface form such as is depicted in FIGURE 7 in somewhat exaggerated form and having a concave face 32 and a convex face 34 is produced. In other respects the piezoelectric device there depicted is constructed according to the method previously explained, using a polarization arrangement such as is indicated in FIGURE 8. When subjected to high-frequency alternating potential, applied for example across a terminal P″ and interconnected terminals Q″ and R″ (with the sets of integrated layers of dielectric oppositely polarized as reviously made evident), the device deforms and changes legree of concavity at a corresponding frequency. Since he concave surface may thus to a desirable extent induce ompressional waves in a fluid in which it may be immersed, such waves can be directed toward a focal point t which the thus transmitted wave energy is concentrated.

As is made evident by the preceding description, improved piezoelectric devices of various configurations may e constructed of various known potentially piezoelectric naterials and combinations in accordance with the novel nethod of the invention, and accordingly it is not desired o restrict the invention to the particular materials, shapes, limensions, and thicknesses of the exemplary devices, nor o the exact firing schedule or polarization arrangements lescribed as these may be varied without departing from he spirit and scope of the invention as defined by the appended claims. For examples, other resinous film-forming inder materials may be used, other polycrystalline piezolectric materials such as other titanates may be used, speially configured films and *monolithic* masses may be ormed, and other conductive materials may be utilized.

We claim:

[1. A piezoelectric device comprising:

an integral block-like structure comprising a unitary mass of polarized polycrystalline piezoelectric material comprising structurally integral first and second portions each polarized oppositely to the other and each of such portions containing a respective one of first and second sets of individually-insulated superposed thin electrically-conductive elements more than two in number and said portions each containing a respective portion of a third set of individually-insulated thin electrically-conductive elements, the said conductive elements of said third set thereof being distributed among and alternating with conductive elements of the said first and second sets of elements; and first and second electric terminal means the first of which is connected to said third set of conductive elements and the second of which is connected to said first and second sets of conductive elements.]

[2. A piezoelectric device according to claim 1, including respective terminal means for each of said sets f electrically-conductive elements.]

[3. A piezoelectric device according to claim 1, said lock-like structure having substantially parallel substanially planar principal faces.]

[4. A piezoelectric device according to claim 1, said tructure having curved first and second principal surfaces.]

[5. A piezoelectric device according to claim 1, said tructure having curved first and second principal surfaces of concave and convex character, respectively.]

*6. A piezoelectric device comprising:*

*an integral block-like structure comprising a monolithic mass of polarized polycrystalline piezoelectric material, said monolithic mass comprising structurally integral first and second portions each polarized oppositely to the other and each of such portions of said monolithic mass containing a respective one of first and second sets of individually-insulated superposed thin electrically-conductive elements more than two in number and said portions of said monolithic mass each containing a respective portion of a third set of individually-insulated thin electrically-conductive elements, the said conductive elements of said third set thereof being distributed among and alternating with conductive elements of the said first and second sets of elements; and*

*first and second electric terminal means the first of which is connected to said third set of conductive elements and the second of which is connected to said first and second sets of conductive elements.*

*7. A piezoelectric device according to claim 6, said structure having curved first and second principal surfaces.*

*8. A piezoelectric device according to claim 6, said structure having curved first and second principal surfaces of concave and convex character, respectively.*

*9. A piezoelectric transducer comprising:*

*a monolithic mass of polycrystalline piezoelectric material, said mass comprising structurally integral first and second portions each of which portions includes marginal portions and inter-marginal portions, at least the intermarginal portions of said first and second portions being polarized and said portions within said marginal portions being uniform and homogeneous, each of said first and second portions within said monolithic mass containing therewithin a respective one of first and second sets of individually-insulated superposed thin electrically-conductive elements more than two in number and further containing a respective portion of a third set of individually-insulated thin electrically-conductive elements, the said conductive elements of said third set alternating with conductive elements of said first and second sets of elements and being insulated therefrom, and*

*electrical connections to the elements of said first, second and third sets of conductive elements, said connections being so arranged relative to the piezoelectric polarization of said inter-marginal portions of said monolithic mass that incident to application to a potential difference across each pair of next-adjacent ones of said conductive elements said monolithic mass piezoelectrically deforms.*

*10. A piezoelectric transducer comprising:*

*first means, including a monolithic ceramic body comprising polycrystalline piezoelectric material, said body having first and second opposite principal surfaces;*

*second means, including a plurality of thin sheet-like electrically conductive elements disposed in spaced-apart superposed relationship with thin central portions of said monolithic ceramic body which include polarized polycrystalline piezoelectric material disposed between next-adjacent elements of said conductive elements and which portions serve to space and individually insulate said elements each from the others thereof; and*

*third means, including electrical connections each to a respective one of said conductive elements to facilitate application and sensing of respective electric potentials between next-adjacent ones of said conductive elements, the respective electric connections being related to the polarization of the interposed piezoelectric material between next-adjacent elements to cause concurrent contraction of a portion of said body adjacent said first surface and expansion of a portion of said body adjacent said second surface incident to application of electric potentials of proper relative polarities to said connections and to alternatively produce across said connections respective electric potentials incident to application of force tending to contract a portion of said body adjacent a first of said surfaces and tending to expand a portion of said body adjacent the other of said surfaces.*

*11. A piezoelectric transducer according to claim 10, in which said first and second opposite surfaces are curved surfaces.*

*12. A piezoelectric transducer according to claim 11, in which said first and second opposite surfaces are substantially planar and parallel.*

*13. A piezoelectric transducer according to claim 11, in which at least about half of the thin central portions of said monolithic ceramic body are polarized oppositely to the remainder of the said thin central portions.*

*14. A piezoelectric transducer according to claim 11, in which said monolithic ceramic body is of disc-like configuration of substantially circular outline.*

*15. A piezoelectric transducer according to claim 11, in which alternate ones of said conductive elements ex-*

*tend to a first region at the periphery of said ceramic body, in which at least half of the intervening ones of said conductive elements extend to a second region at the periphery of said ceramic body, and in which the remainder of the intervening ones of said conductive elements extend to a third region at the periphery of said ceramic body, each of said first second and third regions being spaced from the others thereof along the periphery of said ceramic body, whereby to facilitate making respective electrical connections to said conductive elements.*

References Cited

The following references, cited by the Examiner, are of record in the patented file of this patent or the original patent.

UNITED STATES PATENTS

| | | | |
|---|---|---|---|
| 2,227,268 | 12/1940 | Mason | 310—9.4X |
| 3,054,982 | 9/1962 | Kieser | 310—9.4X |
| 3,258,617 | 6/1966 | Hart | 310—9.8 |
| 3,271,622 | 9/1966 | Malagodi et al. | 310—8.2X |
| 3,390,287 | 6/1968 | Sonderegger | 310—9.8X |

MILTON O. HIRSHFIELD, Primary Examiner

M. O. BUDD, Assistant Examiner

U.S. Cl. X.R.

29—25.35, 25.42, 420, 602, 620; 117—212; 156—89, 224; 171—68.5; 317—101